Jan. 30, 1923. 1,443,789.
H. HUMPHREYS.
TABLE MOUNT FOR METAL AND WOOD WORKING MACHINES.
FILED DEC. 17, 1920. 2 SHEETS—SHEET 1.

Inventor
Hugh Humphreys
By Frank E. Liverance, Jr.
Attorney

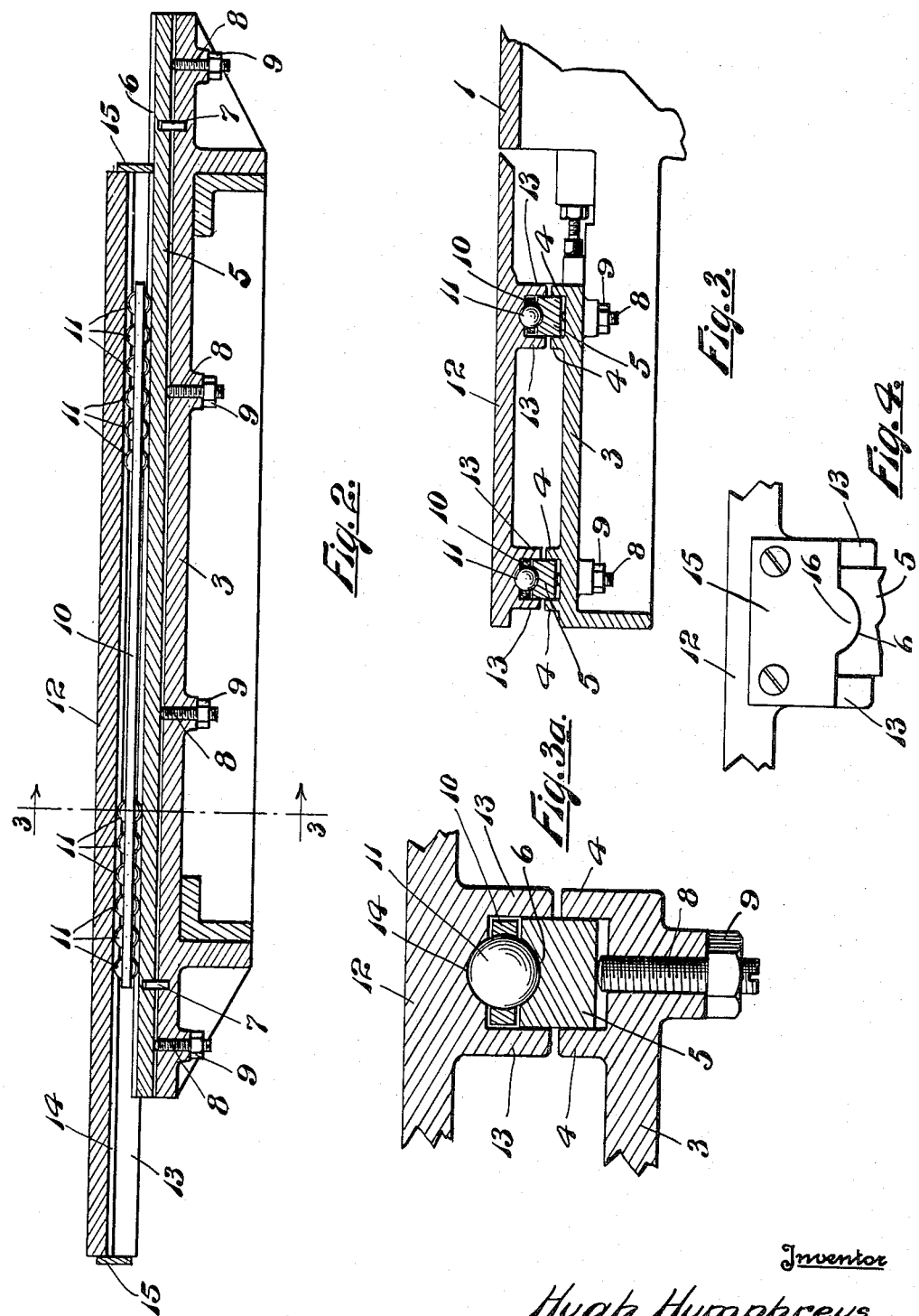

Patented Jan. 30, 1923.

1,443,789

UNITED STATES PATENT OFFICE.

HUGH HUMPHREYS, OF GRAND RAPIDS, MICHIGAN, ASSIGNOR TO OLIVER MACHINERY COMPANY, OF GRAND RAPIDS, MICHIGAN, A CORPORATION OF MICHIGAN.

TABLE MOUNT FOR METAL AND WOOD WORKING MACHINES.

Application filed December 17, 1920. Serial No. 431,395.

*To all whom it may concern:*

Be it known that I, HUGH HUMPHREYS, a citizen of the United States of America, residing at Grand Rapids, in the county of Kent and State of Michigan, have invented certain new and useful Improvements in Table Mounts for Metal and Wood Working Machines; and I do hereby declare the following to be a full, clear, and exact description of the invention, such as will enable others skilled in the art to which it appertains to make and use the same.

This invention relates to a mount for work holding or carrying tables such as are well known and in extensive use in many kinds of wood working machinery, such as sawing machines of different types, sanders, shapers and the like. The invention is also applicable to metal working machines which have a horizontally movable table as a part of their construction, such as planers, surface grinders, etc., the invention being primarily concerned with mounting a table in machines of this character so that the same may be very readily moved back and forth with a minimum of frictional resistance. A further object of the invention is to produce a mount for tables in which anti-friction bearings for the table shall be entirely covered and out of the way and in which no foreign matter, such as shavings and chips from the work acted upon, can come in contact with the bearings to injure the same or to render them less efficient. A still further object of the invention is to make a construction of this kind in which the ways carrying the bearings are readily adjustable so as to position the same truly horizontal irrespective of the fact that the machine itself may rest on a floor which is not absolutely level, or which may be adjusted as may be necessary to true the table with respect to the saw, shaper, or other tool which may act upon the work carried by the table. All of these features and objects, together with many others not specifically set forth at this time will appear fully and in detail as understanding of the invention is had from the following description, taken in connection with the accompanying drawings, in which, Fig. 1 is a partial plan view of a saw table equipped with my invention.

Fig. 2 is a vertical section taken longitudinally of the movable work carrying table.

Fig. 3 is a transverse vertical section taken substantially on the plane of line 3—3, of Fig. 2.

Figure 1:
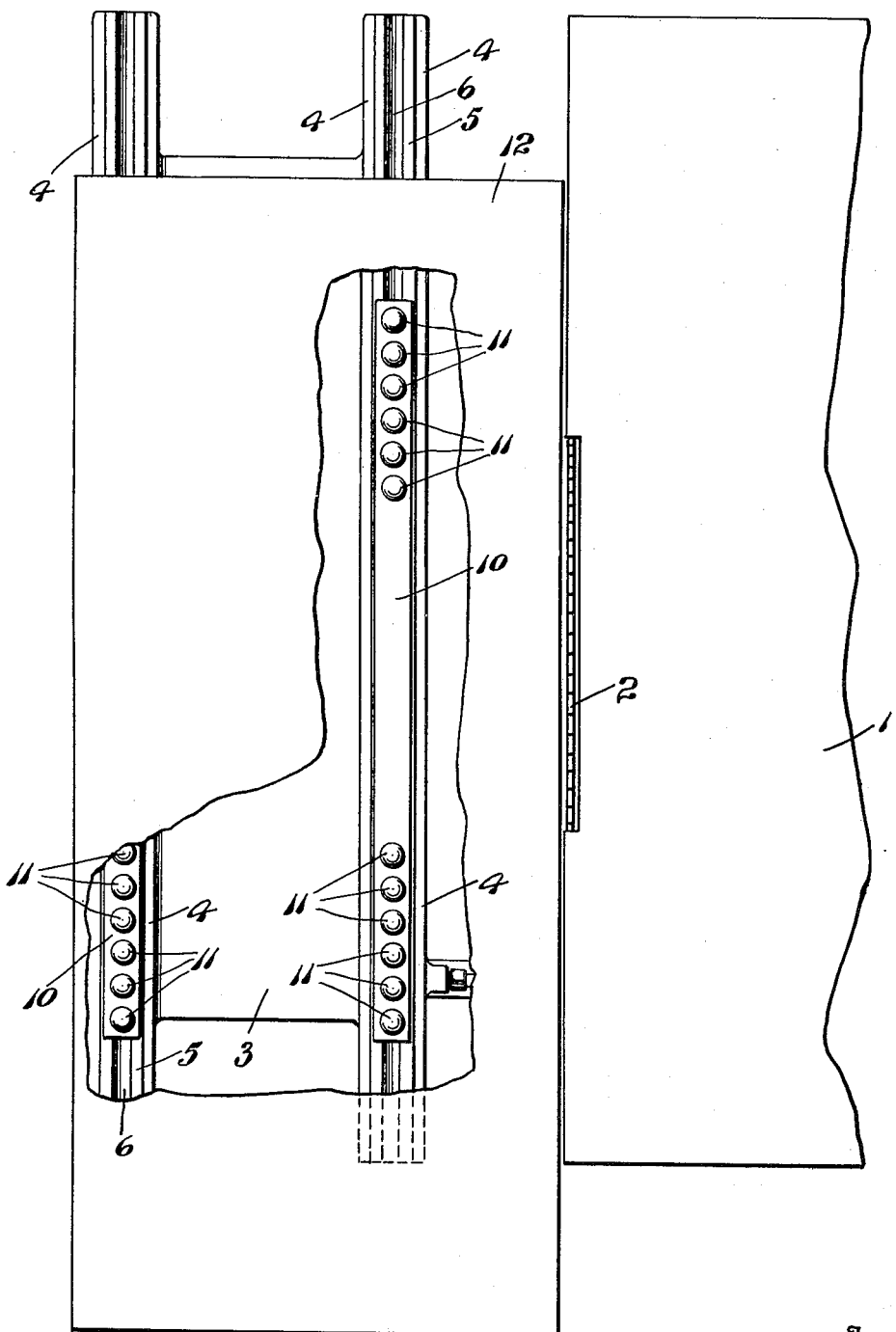

Fig. 3ᵃ is a fragmentary enlarged section, similar to that shown in Fig. 3, but showing the adjustment of the bearing ways in greater detail and with greater clearness, and Fig. 4 is a fragmentary end elevation illustrating the scraper used to keep the ways clean for the traverse of the roller bearings.

Like reference characters refer to like parts in the different figures of the drawings.

The invention is shown applied to a saw table. In the construction thereof, a stationary table 1, supported in any desired manner has a saw 2 mounted vertically adjacent one side thereof, at which side the movable table which carries the work is located. This movable table is positioned above a supporting member 3, being a part of the frame of the machine, on which at spaced apart points two pairs of upwardly extending parallel ribs 4 are made, the same being parallel to each other and to the adjacent edge of the table 1. A bar 5 formed at its upper side with a longitudinal concaved recess 6 is located between the ribs 4, one bar for each pair of ribs and furnishes the ways for the mounting of anti-friction bearings. The bars 5 are held against longitudinal movement by pins 7 attached to the member 3 and extending upwardly between ribs 4 into openings made in the under sides of the bars 5, as shown.

Bars 5 are adjustable within a limited range through screws 8 which thread upwardly through the member 3 against the under sides of the bars and which are locked in any position to which adjusted by nuts 9 threaded on the lower ends thereof and adapted to bind against the lower side of said member 3. This permits a levelling of the bars and positioning thereof in the same plane to compensate for any differences in machining thereof, or any other discrepancies which may arise from any cause as is evident.

A flat ball retaining bar 10 carrying a plurality of ball bearings 11 at each end is located above each bar 5, the lower sides of balls 11 riding in the concaved recesses or ways 6 of bars 5. The balls may be retained in the bars 10 in any preferred and suitable manner. The movable table 12 lies over the supporting member 3 and is formed on its lower side with two pairs of downwardly extending ribs 13 which are adapted to come directly above the corresponding pairs of ribs 4 on the member 3, the ribs 13 at their lower portions coming below the upper sides of the bars 5 as best shown in Fig. 3ª. On the under side of the movable table 12 and lengthwise thereof between each pair of ribs 13 a long concaved recess 14 is made into which the upper portions of the balls 11 pass, it being evident that the movable table is wholly supported by the balls and that it rides thereon and may be easily moved with an almost entire elimination of friction. At each end of the table 12 and at each end of the two pairs of ribs 13 a flat flexible member 15 is attached, each having a projection 16 at its lower end shaped to fit the concaved way 6 in its adjacent bar 5. These members serve as brushes or scrapers to keep the ways clean, it being evident that chips, shavings, saw dust and the like are very liable to be thrown over the tables and beyond into the ways and the same must be continually removed so as not to come in contact with the ball bearings. And the same holds true with respect to metal working machines having movable tables similarly mounted.

A mount for movable tables of the character described is very practical, durable and efficient. Its advantages are obvious. The movable table may be bodily removed at any time for access to the bearings. The table may be perfectly adjusted in a very simple manner. Altogether the construction is one of especial merit and has so proven in practice.

While I have stated that this table mount is of value in metal and wood working machines, it is not to be considered as restricted in use thereto alone. For instance, there are many other places where such mount is available, as in textile machinery, or any other place where machines having tables mounted for longitudinal or reciprocatory movements are used. My invention, accordingly, is to be considered to comprehend all places of application where available, and to not be restricted other than as called for by the terms of the claims defining the invention.

I claim:

1. In machines of the character described, a substantially horizontal supporting member formed at its upper side with a plurality of pairs of parallel upwardly extending ribs positioned lengthwise of the member, a plurality of screws threaded upwardly through the member between the ribs of each pair of ribs, a bar formed at its upper side with a longitudinal concaved recess or way and located between the ribs of each pair of ribs and resting on the upper ends of the screws, pins extending upwardly from said supporting member into openings in the under side of the bars, a ball retaining bar carrying a plurality of balls at each end located over each of the first bars, the balls riding in the ways of the first bars, and a table formed on its under side with a plurality of pairs of downwardly projecting ribs in parallelism and located over the ribs on the supporting member, said table on its under side between the ribs of each pair of ribs being formed with longitudinal concaved recesses into which the upper portions of said balls enter.

2. In machines of the character described, a substantially horizontal supporting member formed at its upper side with a plurality of parallel upwardly extending ribs positioned lengthwise of the member, a bar formed at its upper side with a longitudinal concaved recess or way and located one between the ribs of each pair of ribs, means for adjusting the bar up and down with respect to the supporting member, means for holding the bar against longitudinal movement with respect to the supporting member, a plurality of sets of balls carried in the way of each bar, means for spacing the sets of balls and retaining them in place with respect to each other, and a table formed on its under side with a plurality of pairs of downwardly projecting parallel ribs and located above the supporting member with its ribs positioned directly over the ribs of the supporting member, said table on its under side between the ribs of each pair of ribs being formed with longitudinal concaved recesses or ways into which the upper portions of the balls enter.

3. In machines of the character described, a substantially horizontal supporting member formed at its upper side with a plurality of pairs of parallel upwardly extending supporting ribs, a bar formed at its upper side with a longitudinal concaved recess or way and located one between each pair of ribs, means holding said bars against longitudinal movement with respect to the supporting member, means for vertically adjusting said bars, a plurality of balls carried in the way of each bar, and a table formed on its under side with a plurality of pairs of downwardly projecting parallel ribs and located above the supporting member with its ribs positioned directly over the ribs of the supporting member, said table on its under side between each pair of ribs being provided with longitudinal concaved recesses or ways into which the upper portions of the balls enter.

4. In combination, a substantially horizontal supporting member, a plurality of bars thereon formed for carrying balls at their upper sides, a table located over the support and provided on its under side with cooperating ways to receive the upper portions of the balls, balls located between the bars and table, means for adjusting the bars vertically with respect to the table at intervals in the length of the bars, and means carried by the table at each end for brushing the ways on the support and keeping the same free of foreign matter, substantially as described.

5. In machines of the character described, a substantially horizontal supporting member having ball carrying ways carried thereby in parallel spaced apart relation, a ball retaining bar carrying a plurality of balls at each end located over each of the ways with the balls riding in the ways, a table formed on its under side with a plurality of pairs of downwardly extending ribs paralleling each other, the ribs of each pair of ribs extending downwardly by each side of the ball retaining bar, said table on its under side between the ribs of each pair of ribs being formed with longitudinal concaved recesses or ways into which the upper portions of said balls enter, and cleaners attached at each end of the table and shaped to enter and conform to the first mentioned ways, substantially as and for the purposes described.

In testimony whereof I affix my signature.

HUGH HUMPHREYS.